United States Patent [19]

Callaway

[11] Patent Number: 4,702,443
[45] Date of Patent: Oct. 27, 1987

[54] CORD HOLDING DEVICE

[76] Inventor: James J. Callaway, Moran Rd., Franklin, Tenn. 37064

[21] Appl. No.: 894,835

[22] Filed: Aug. 8, 1986

[51] Int. Cl.$^4$ .............................................. F16L 3/00
[52] U.S. Cl. ......................................... 248/51; 5/496; 5/508; 24/72.5; 24/132 AA; 24/456; 24/462; 248/74.4; 248/205.1
[58] Field of Search ...................... 248/74.4, 51, 205.1, 248/231.6, 359 F; 24/72.5, 460, 462, 456, 132 AA; 5/496, 508, 503, 504, 424, 494, 498

[56] References Cited

U.S. PATENT DOCUMENTS

| | | |
|---|---|---|
| 806,251 | 12/1905 | Childs . |
| 2,435,082 | 1/1948 | Huber .............................. 24/72.5 X |
| 2,557,877 | 6/1951 | Kluson ........................... 24/132 AA |
| 2,876,464 | 3/1959 | Helverson ................................ 5/317 |
| 3,179,991 | 4/1965 | Seal ......................................... 24/73 |
| 3,426,412 | 2/1969 | Streng et al. ..................... 24/462 X |
| 3,491,412 | 1/1970 | Johnson ............................ 248/205.1 |
| 4,417,710 | 11/1983 | Adair ................................... 248/51 |
| 4,431,154 | 2/1984 | Hamm . |
| 4,484,367 | 11/1984 | Jenkins . |
| 4,562,624 | 1/1986 | Kanzaka . |

FOREIGN PATENT DOCUMENTS 2735509  2/1979  Fed. Rep. of Germany .

Primary Examiner—J. Franklin Foss
Assistant Examiner—David L. Talbott
Attorney, Agent, or Firm—Holman & Stern

[57] ABSTRACT

A cord holding device for retaining an electrical cord in strategic position on a hospital bed or convenient location relative to a patient lying on the bed has a base member which in use may be secured by adhesive or a belt to a mattress cover or mattress pad under a bed sheet. A cord holder member snaps onto the base member over the bed sheet so as to trap the bed sheet therebetween. The cord holder member has a cylindrical wall with spaced top-opening slots for receipt of the cord with the cord extending chord-wise across the holder member and the device further includes a cover member which snaps onto the holder member to trap the cord in the slots. The cover member may have a depending cylindrical wall with bottom-opening slots complementary to the slots in the cord holder member so as to trap the cord therebetween and so that the cover member can be rotated on the holder member thereby adjusting the effective width of the slots to suit different size cords. A pushbutton device may be provided on the cord holder member for engaging the base member to separate these when the pushbutton is depressed.

11 Claims, 9 Drawing Figures

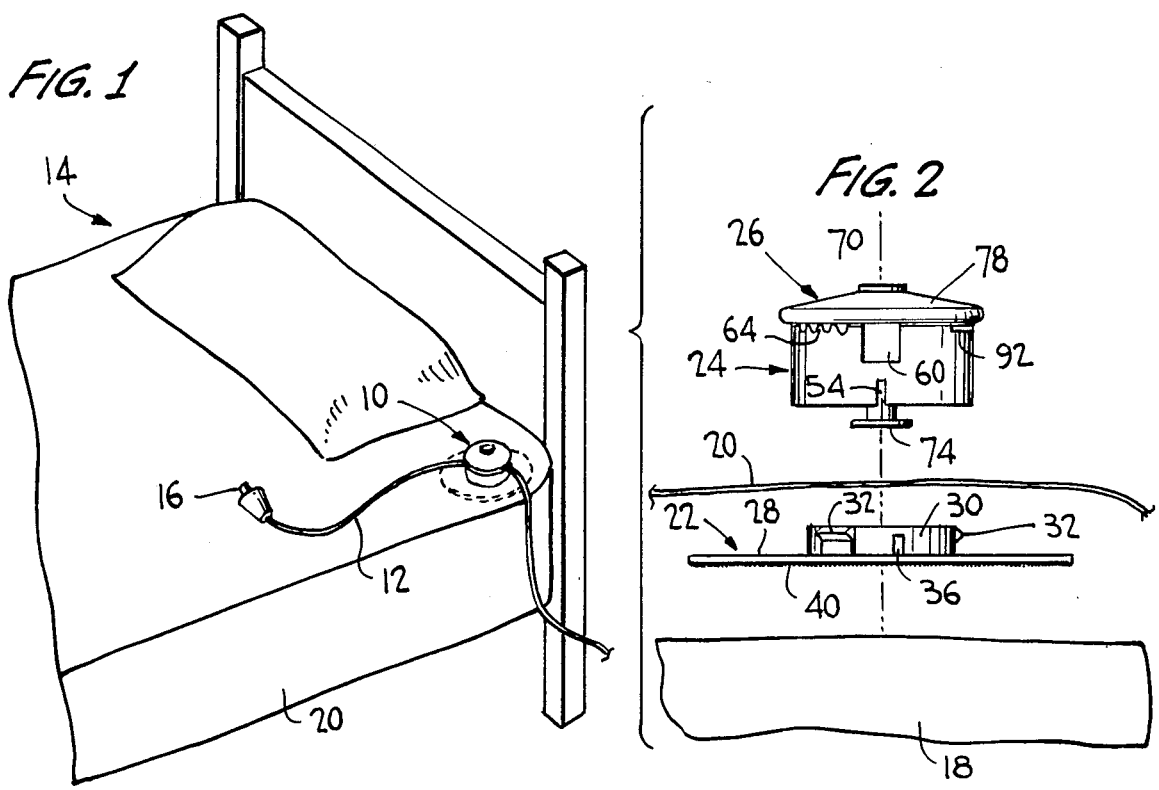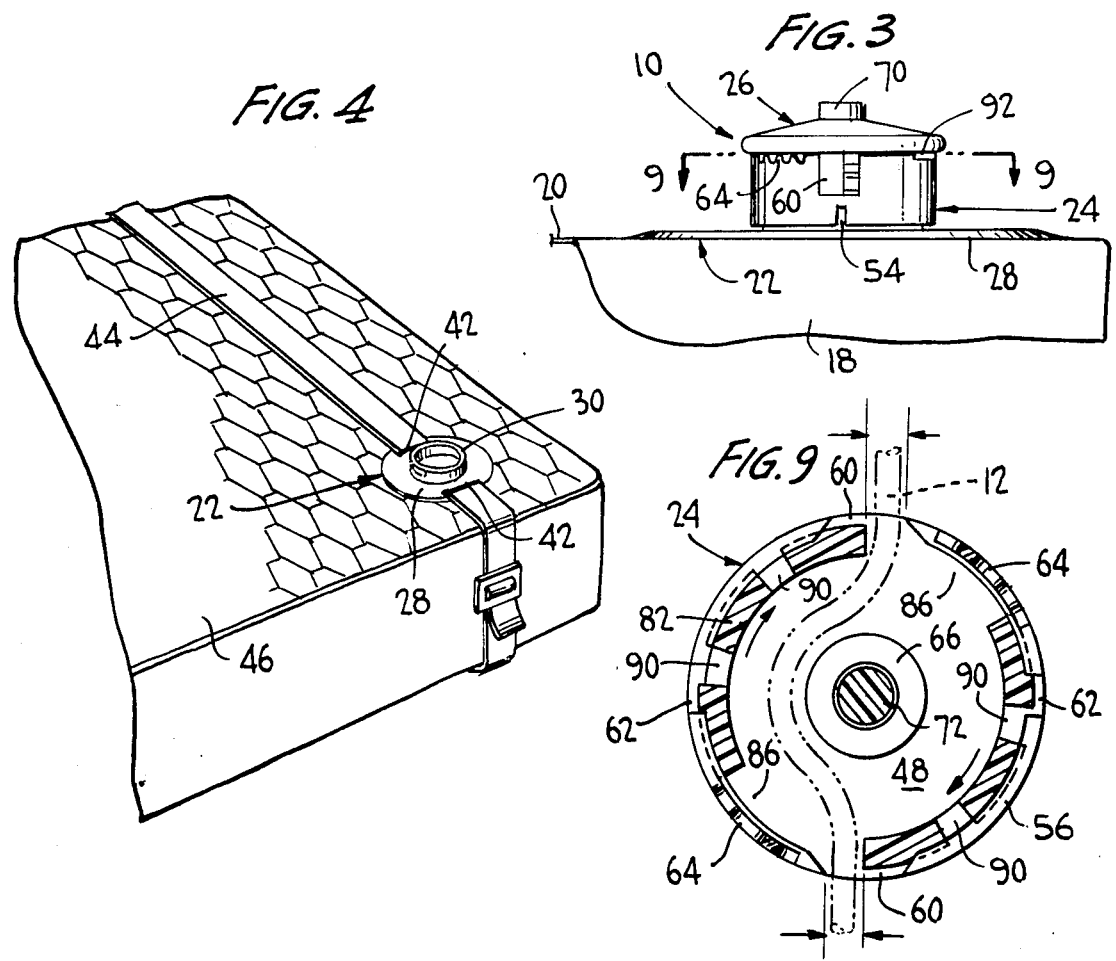

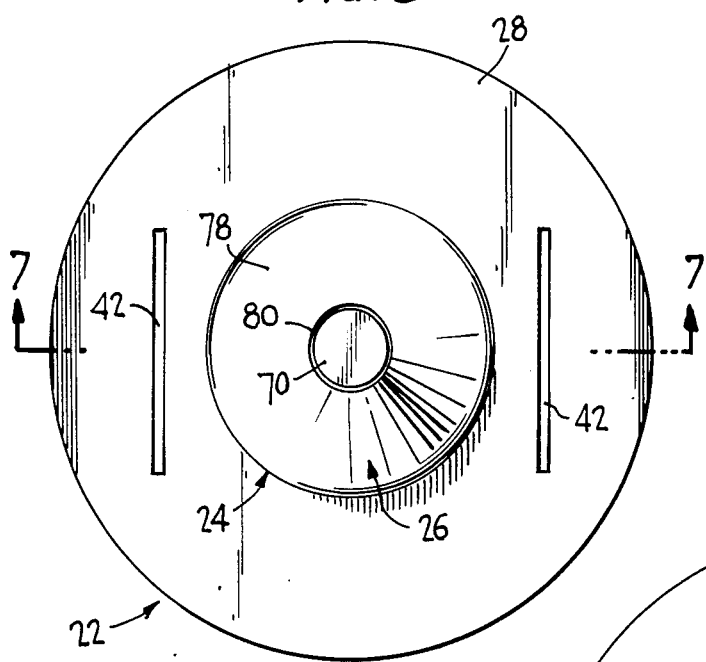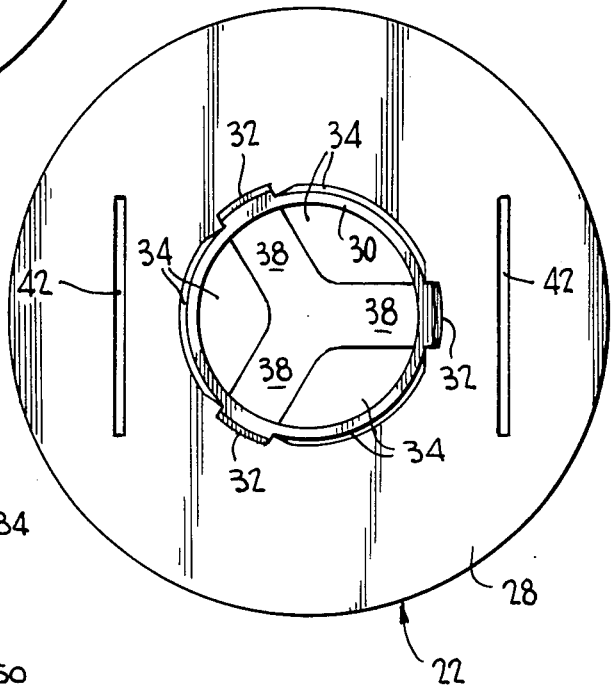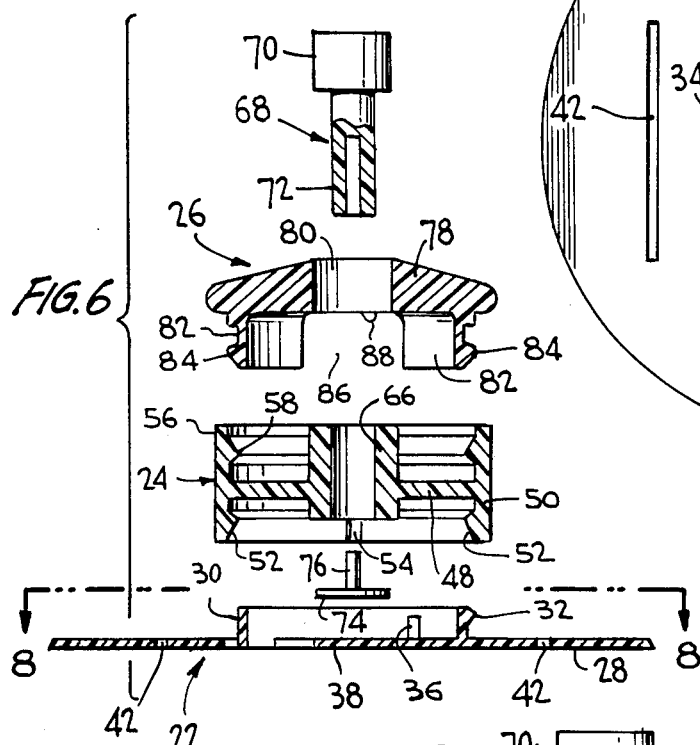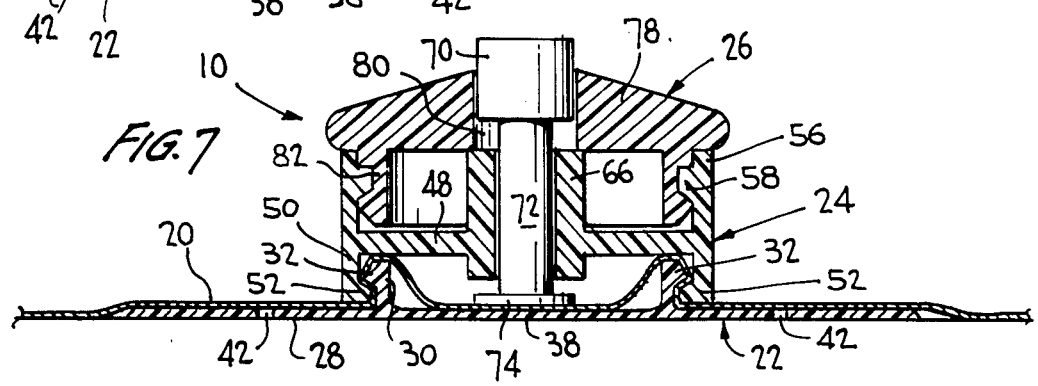

CORD HOLDING DEVICE

BACKGROUND OF THE INVENTION

This invention relates to a cord holding device which is particularly although not exclusively suitable for securing an electrical or like cord on a patient's hospital bed or the like in an accessible position convenient to the patient.

Hospital rooms are usually provided with various patient-operable electrical devices, such as nurse call buttons, radios, and the like, and it is obviously desirable for their operating switches, generally on cords, to be readily accessable to a patient lying in bed. Often, such electrical cords, terminating in operating switches, are simply tied around the bedhead, but this is not particularly convenient, and there have been proposals in the past for the provision of clamp-type devices and the like which secure such cords in a desired position to the actual bed clothes. Examples of such devices may be seen, in prior U.S. Pat. Nos. 2,876,464 and 3,179,991.

SUMMARY OF THE INVENTION

Various objects of the invention include, for example, the provision of a novel form of cord holding device for the general purpose indicated in securing electrical cords to hospital or other beds; the povision of a cord holding device which can be securely retained in a required position on the bed clothes while being relatively simple to release and reposition; a cord holding device which can locate and secure cords of different size; and a cord holding device from which the cord can be released, if required, without removing the entire device from the bed, so that the cord can be resecured to the bed in the original position.

The invention accordingly provides a three-part cord holding device comprising a base member, which in use may be secured by adhesive or by a belt to a mattress cover, pad or the like under a bed sheet, a cord holder member which snaps onto the base member over the bed sheet, so as to trap the bed sheet therebetween, the cord holder member having a cylindrical wall with spaced top-opening slots for receipt of the cord with the cord extending chord-wise across the holder member, and a cover member which snaps onto the holder member to trap the cord in the slots. The cover member may have a depending cylindrical wall with bottom-openings slots complementary to the slots in the cord holder member so as to trap the cord therebetween, a so that the cover member can be rotated on the holder member thereby adjusting the effective width of the slots to suit different size cords. Friction means, such as peripheral teeth on one member and an interfitting projection on the other member, may be provided for retaining the cover member in a selected rotational position.

The holder member may be provided with a pushbutton for engaging against the base member and forcing these members apart when the pushbutton is depressed, thereby separating the holder member from the bed clothes, the pushbutton having an actuating portion extending upwardly through a central opening in the cover member. All of the components of the tender may be molded in a hard plastic.

Additional features and advantages of the invention will become apparent from the following description and claims read in conjunction with the attached drawings.

BRIEF DESCRIPTION OF DRAWINGS

FIG. 1 is a perspective view of a head portion of a hospital or like bed showing a cord holding device in accordance with the invention secured to the bedding, FIG. 2 is an exploded elevational view of parts of the cord holding device, a mattress, and a bed sheet, FIG. 3 is a view similar to FIG. 2 showing the cord holding device in assembled condition secured to the bed sheet, FIG. 4 is a perspective view of a part of a mattress showing an alternative manner of attachement of the cord holding device, FIG. 5 is an enlarged plan view of the cord holding device in assembled condition, FIG. 6 is an exploded sectional elevational view of the cord holding device, FIG. 7 is a sectional view on line 7—7 of FIG. 5, FIG. 8 is a sectional view on line 8—8 of FIG. 6, and FIG. 9 is a sectional view on line 9—9 of FIG. 3.

DESCRIPTION OF PREFERRED EMBODIMENTS

As shown in FIG. 1 of the drawings, a cord holding device 10 in accordance with the invention is used for locating and securing an electrical cord 12 in strategic position on a hospital bed 14 or the like, so that a cord switch 16, operating for example nurse call equipment, may be situated in a convenient position readily accessable to a patient lying on the bed. It is understood that the bed has a mattress 18 and a sheet 20 over the mattress. The cord holding device 10 includes a base member 22, a cord holder member 24, and cover member 26, all of which may be molded in a hard plastic.

Base member 22 has a flat circular base flange 28, and a first circular wall 30 projecting upwardly from the base flange and formed with outwardly projecting peripherally spaced teeth 32. Cutouts 34 in the base flange and cutouts 36 in wall 30 provide the wall with a degree of resiliency. Centrally of wall 30, the base flange has radial web portions 38. The under surface of base flange 28 may be provided with a contact adhesive 40 (FIG. 2) whereby the base member may be secured on the cover of mattress 18. Further, the flange may have spaced parallel slots 42 for receipt of a belt 44 (FIG. 4) forming an alternative means for attaching the base member, for example to a mattress having a quilted or like type of mattress pad 46. The belt in this case also provides a convenient means for retaining the pad on the mattress.

Cord holder member 24 has a horizontal flange portion 48 from which depends a second circular wall 50 with inwardly projecting ribs 52 complementary to the teeth 32 on wall 30, whereby the cord holder member can be releasably clamped onto the base member over bed sheet 20, by interengagement of the teeth and ribs (See FIG. 7) thereby trapping the sheet therebetween and securely retaining the cord holder member on the bed. Cut out 54 provide wall 50 with a degree of resiliency.

Holder member 24 defines a third circular wall 56 extending upwardly from flange portion 48, wall 56 having a inwardly directly circumferential rib 58 and being formed with a first set of diametrically opposed top-opening slots 60, and a second set of diametrically opposed top-opening narrower slots 62. Also, at the rim of wall 56 adjacent slots 60 are respective rows of teeth 64.

The horizontal flange portion 48 of the holder member further supports a vertically extending tubular boss 66 which receives a two-part pushbutton assembly comprising a head portion 68 with an actuator 70 and a hollow stem 72, and a tail portion comprising a flange 74 and a pin 76 which is a press fit in stem 72. It will be understood that when the holder member is clamped onto the base member, flange 74 will engage the center of webs 38 (or the bed sheet which extends thereover) and depression of the pushbutton while holding onto the holder member is effective in providing a separating force for unclamping and released the holder member from the base member by separating teeth 32 and ribs 52.

Cover member 26 has a top wall 78 with a central opening 80 for receipt of pushbutton actuator 70, and a depending fourth circular wall 82 with external ribbing 84 and bottom-opening slots 86. The cover member can thus be snapped into engagement with holder member 24 by interengagement of ribs 84 and 58 and with slots 86 in registry with slots 60 or 62. Further, rotating of the cover member adjusts the degree of registration of the respective slots on the cover and holder members, so as to adjust their effective width. In use, it is understood that cord 12 is placed through slots 60 or 62 of the holder member prior to attachment of the cover member, so that the cord extends chord-wise across the holder member as shown in FIG. 9. Then, when the cover member is attached, it may be rotated to a position in which the walls defining the registering slots of the cover member and holder member grip the cord therebetween. Projections 88 (See FIG. 6) are provided on the cover member for frictionally snapping into engagement between the respective teeth 64 on the holder member so as to retain the cover member in the rotationally adjusted cord-gripping position. The resilience of wall 82 is enhanced by further cutouts 90 (FIG. 9). The holder member may be provided at its upper rim with a slot 92 for receiving a screwdriver or the like for levering the cover member loose to disconnect same and release the cord when required.

It will be seen that the invention provides a useful form of cord holding device for use on hospital beds and the like, which can readily be released by pushbutton, if required, which has a convenient adjustment facility for different sized cords, which provides ready removal of the cover for cord removal and replacement, and which generally fulfills the objects of the invention.

While only preferred embodiments of the invention have been described herein in detail, the invention is not limited thereby and modifications can be made within the scope of the attached claims.

What is claimed is:

1. A cord holding device for retaining an electrical cord on a bed covering such as a bed sheet laid over an underlying bedding element such as a mattress cover, the cord holding device including three connectable disconnectable parts, a first of said parts comprising a base member having a base flange, attachment means for securing the flange substantially face-to-face on the bedding element under the bed covering, and first clamp means extending upwardly from the base flange, a second of said parts comprising a cord holder member including second clamp means for snapping onto the first clamp means over the bed covering and trapping the bed covering therebetween, and first peripheral wall means extending upwardly from the second clamp means, the first peripheral wall means defining spaced top-opening slots for receiving the electrical cord with the cord extending chord-wise across the cord holder member, the third of said parts comprising a cover member for snapping into engagement with the first wall means and retaining the cord in the slots.

2. The invention as defined in claim 1 wherein the cover member has a second peripheral wall means with bottom-opening slots for registering with the top-opening slots in the first wall means for trapping the cord therebetween.

3. The invention as defined in claim 2 wherein the first and second peripheral wall means are of cylindrical form for providing rotation of the cover member when engaged on the cord holder member to adjust the effective width of the respective slots to accomodate cords of different size.

4. The invention as defined in claim 3 including friction means between the cover member and cord holder member for frictionally retaining the cover member in selected rotational positions on the cord holder member.

5. The invention as defined in claim 4 wherein the friction means comprises circumferentially extending teeth on one of the cord holder member and cover member, and a projection on the other of the cord holder member and cover member adapted to snap into position between adjacent teeth in the selected rotational positions of the cover member.

6. The invention as defined in claim 1 including a pushbutton carried by the cord holder member for engaging the base flange of the base member and disengaging the cord holder member from the base member by depression of the pushbutton, the cover member having an opening through which an upper actuating portion of the pushbutton projects.

7. The invention as defined in claim 1 wherein the attachment means comprises an adhesive means on an under surface of the base flange.

8. The invention as defined in claim 1 wherein the attachment means comprises spaced parallel slots in the base flange for receipt therethrough of a belt for securing the tender around a mattress.

9. A cord holding device having three connectable disconnectable parts, a first of said parts comprising a base member and means for securing the base member to a mattress cover, pad or the like under a bed sheet, a second of said parts comprising a cord holder member for snapping onto the base member over the bed sheet so as to trap the bed sheet therebetween, the cord holder member having a peripheral wall with spaced top-opening slots for receipt of a cord with the cord extending chord-wise across the holder member, and a third of said parts comprising a cover member for attachment on the holder member to trap the cord in the slots, the cord holder member carrying a pushbutton for engaging against the base member for forcing the cord holder member and base member apart when the pushbutton is depressed thereby separating the cord holder member from the base member, the pushbutton having an actuating portion extending upwardly through a central opening in the cover member.

10. The invention as defined in claim 9 wherein the peripheral wall of the holder member is cylindrical and the cover member has a complementary cylindrical wall with bottom-opening slots comlementary to the slots in the cord holder member wall so as to trap the cord therebetween, whereby the cover member can be rotated on the holder member for adjusting the effective width of the slots to suit different size cords.

11. The invention as defined in claim 10 including peripheral teeth on one of the cord holder member and cover member and in interfitting projection on the other of the cord holder member and cover member for frictionally retaining the cover member in a selected rotational position.

* * * * *